United States Patent [19]

Sugimori et al.

[11] 4,251,147
[45] Feb. 17, 1981

[54] ELECTRONIC FLASH WITH CALCULATOR

[75] Inventors: Shiro Sugimori, Kawasaki; Tetsuro Goto, Tokyo; Sumiko Maruyama, Ichikawa, all of Japan

[73] Assignee: Nippon Kogaku K.K., Tokyo, Japan

[21] Appl. No.: 31,591

[22] Filed: Apr. 19, 1979

[30] Foreign Application Priority Data

May 25, 1978 [JP]  Japan ............................ 53-69643[U]

[51] Int. Cl.³ ...................... G03B 15/03; G03B 17/00
[52] U.S. Cl. .................................. 354/127; 354/149; 354/289
[58] Field of Search ................. 354/21, 28, 37, 41, 354/58, 289, 126, 127, 128, 139, 149; 352/78 C

[56] References Cited
U.S. PATENT DOCUMENTS

| 2,967,469 | 1/1961 | Lachaize .............................. 354/149 |
| 4,080,612 | 3/1978 | Maitani et al. .................... 354/289 X |
| 4,165,166 | 8/1979 | Engelsmann et al. ............... 354/149 |

FOREIGN PATENT DOCUMENTS

| 2245870 | 3/1974 | Fed. Rep. of Germany ........... 354/126 |
| 2658257 | 7/1977 | Fed. Rep. of Germany ........... 354/149 |

Primary Examiner—J. V. Truhe
Assistant Examiner—Shelley Wade
Attorney, Agent, or Firm—Shapiro and Shapiro

[57] ABSTRACT

A speed-light, or electronic flash, having a support column provided between its light flashing part and its fitting member to be fitted with an accessory shoe of a camera body, wherein an exposure calculator device operable by a guide number is in cylindrical form so as to surround or enclose the support column.

8 Claims, 4 Drawing Figures

ELECTRONIC FLASH WITH CALCULATOR

BACKGROUND OF THE INVENTION

This invention relates to a speed-light, or electronic flash, equipped with a calculating device. It is known in the prior art to provide an electronic flash with a device for calculating a combination of an aperture value and a film-to-subject distance in relation to sensitivity of a photographic film loaded in a camera. THis calculating device, as is well known, is to indicate a combination of the above-mentioned aperture value and the film-to-subject distance on the basis of a computation formula for an exposure guide number (G.N.), i.e., $$GN = \sqrt{\frac{Sx}{Sa}} \cdot A \cdot D$$

(where Sx denotes an arbitrary film sensitivity; Sa represents a reference film sensitivity; A is an aperture value; and D is a distance of film to a photographic object).

Heretofore, most of the calculator calculators of this sort have been mounted on the upper, rear, or side surfaces of the speed-light or electronic flash, and their design has also been mostly of a flat disc shape (with graduations being made on the flat surface of a rotational disc). Such calculating devices are inferior in their operability because an operator cannot properly place his (or her) finger on the device. Also, they have the disadvantage that, when the calculator is mounted on the camera, viewing positions of both camera viewfinder and calculator are so separated that viewing operations are difficult.

Further, with the conventional calculating devices with the setting of the film sensitivity graduation of the calculating device is performed separately from the setting of the film sensitivity dial of a camera provided with a light metering circuit. The setting operations are rather complicated, with the consequence that, when the film sensitivity graduation as set in the calculator differs from that as set on the sensitivity setting dial of the camera, an error in exposure results when performing flash photography in accordance with indication on the calculator.

SUMMARY OF THE INVENTION

In view of such disadvantages inherent in the conventional electronic flash, or speed-light, in a photographic camera, it is a primary object of the present invention to provide a speed-light equipped with a calculating device which is easy to operate and observe.

It is a secondary object of the present invention to provide a speed-light provided with a calculator which operates in association with mounting of the speed-light on the camera.

According to the present invention, in one aspect thereof, there is provided a speed-light having a calculating device constructed so that a support column is provided between a fitting member capable of being fitted to an accessory shoe on a camera and the main body of a light flashing section, and so that the calculator has a cylindrical shape surrounding the supporting column.

According to the present invention, in another aspect thereof, there is provided a speed-light having a calculator constructed so that a signal means provided on a film sensitivity setting dial of a camera determines the position of a film sensitivity sleeve of the calculator when the speed-light is mounted on the camera body.

The foregoing objects and other objects as well as specific construction and function of the speed-light according to the present invention will become more apparent and understandable from the following detailed description, when read in connection with the accompanying drawings.

DESCRIPTION OF PREFERRED EMBODIMENTS

Figure 1:
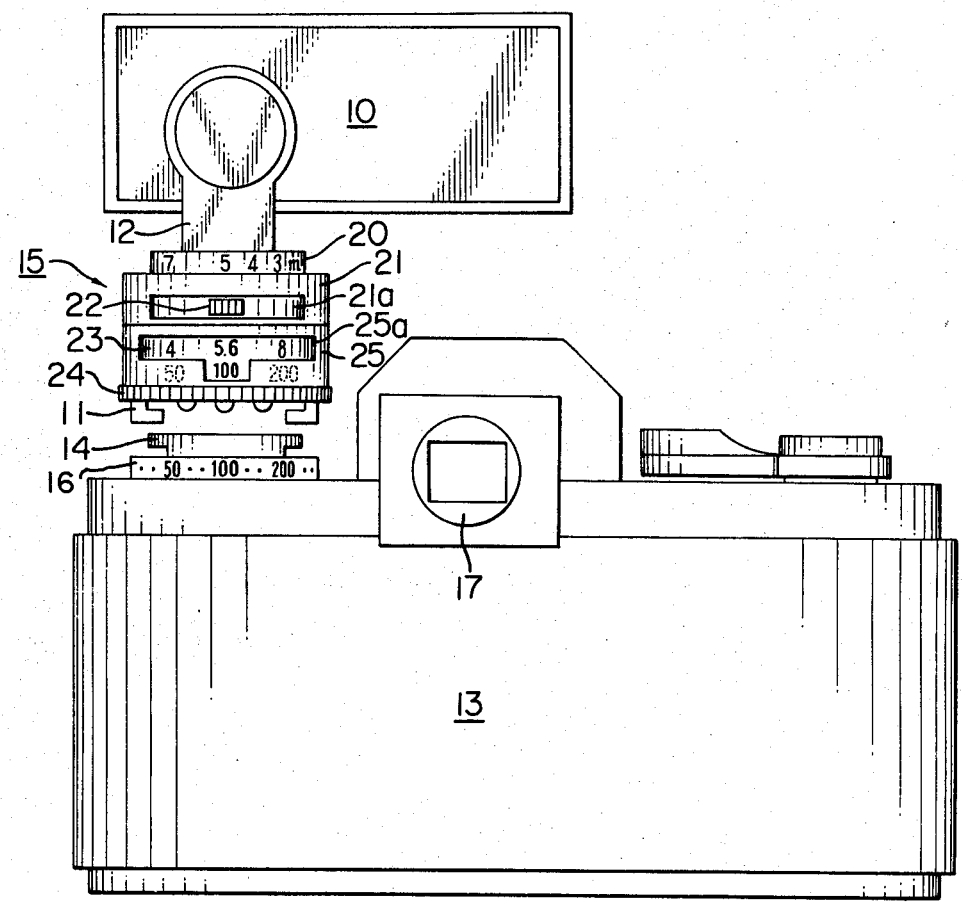
FIG. 1 is an elevation view of a calculating device according to a first embodiment of the present invention, the device being shown in association with a camera (seen from the rear)

Referring to FIG. 1, a main body or housing 10 of a speed-light (electronic flash) has a supporting pillar or column 12 provided at its bottom end with a mounting member 11 which is fitted with an accessory shoe 14 disposed around a film rewinding crank of the camera main body. The supporting column 12 usually supports the speed-light main body 10 in a rotatable manner. A calculating device 15 is disposed in the vicinity of the mounting member 11 at side of column 12 opposite the light flashing surface of the speed-light.

With such disposition the calculating device 15 can be mounted on the accessory shoe 14 close to the camera main body 13. Therefore, the viewing position of a camera view-finder 17 and that of the exposure calculating device 15, according to the present invention, are very close to each other, with the consequence that the result of the exposure calculation can be very easily verified.

The calculating device 15 is constructed as follows. A distance graduation cylinder 20 if fixedly mounted on the supporting column 12, around the peripheral surface of which graduations for the object distance are made. A cylindrical selector cover 21 is also fixedly mounted on the supporting column 12, and has a window 21a of a length which permits movement of a light adjusting selector 22. The light adjusting selector 22 changes the sensitivity of a light quantity integration circuit (not shown since it is well known) of the speed-light, which varies the lens value to be used by changing the integration time constant, for example. This light adjusting selector 22 can be moved in the horizontal direction as shown in the drawing.

An aperture value and film sensitivity graduation cylinder 23 and an operating cylinder 24 are rotatably held around the supporting column 12. On the upper peripheral surface part of the cylinder 23, the aperture values are graduation, and, on the lower periperal surface part thereof, the film sensitivity values are graduated. Both cylinders 23 and 24 are integrally formed so that they may rotate together. A cylindrical cover 25 surrounds the cylinder 23. It has an indication window 25a to indicate a film value of film loaded in the camera and an aperture value which is usable for the particular film sensitivity. The cover 25 itself is fixed to the supporting column 12.

The graduations are made on the basis of the proper guide number of the speed-light so as to satisfy the computation formula for the guide number, as is well known. Incidentally, the respective graduations are logarithmic graduations.

The light adjusting selector 22 at the illustrated position signifies that, when the operating cylinder 24 is rotated to cause the film sensitivity of the film loaded in the camera to appear in the indication window 25a, the speed-light can be operated with the combination of the object distance and the aperture value which meet at the position of the light adjusting selector 22. Such a combination naturally changes when the film sensitivity changes. In other words, when the light adjusting selector 22 shifts rightward from the illustrated position in FIG. 1, the time constant of the light quantity integration circuit is changed (i.e., increases) as mentioned above so that the aperture value increases and the object distance decreases. When the light adjusting selector 22 is shifted leftward, the changes in the aperture value and the object distance are reversed from the above.

According to this first embodiment of the present invention, since the operating cylinder 24 is rotated by placing a finger on its peripheral surface at the end the camera body, its operation is easy. Since the film sensitivity setting dial is around the film rewinding crank of the camera, comparison of the film sensitivity as set by the calculating device with that as set by the film sensitivity setting dial 16 of the camera can be done easily. In a modification the object distance graduation and the aperture value graduation can be mutually exchanged so as to be displayed on the cylinders 23 and 21, respectively.

Figure 2:
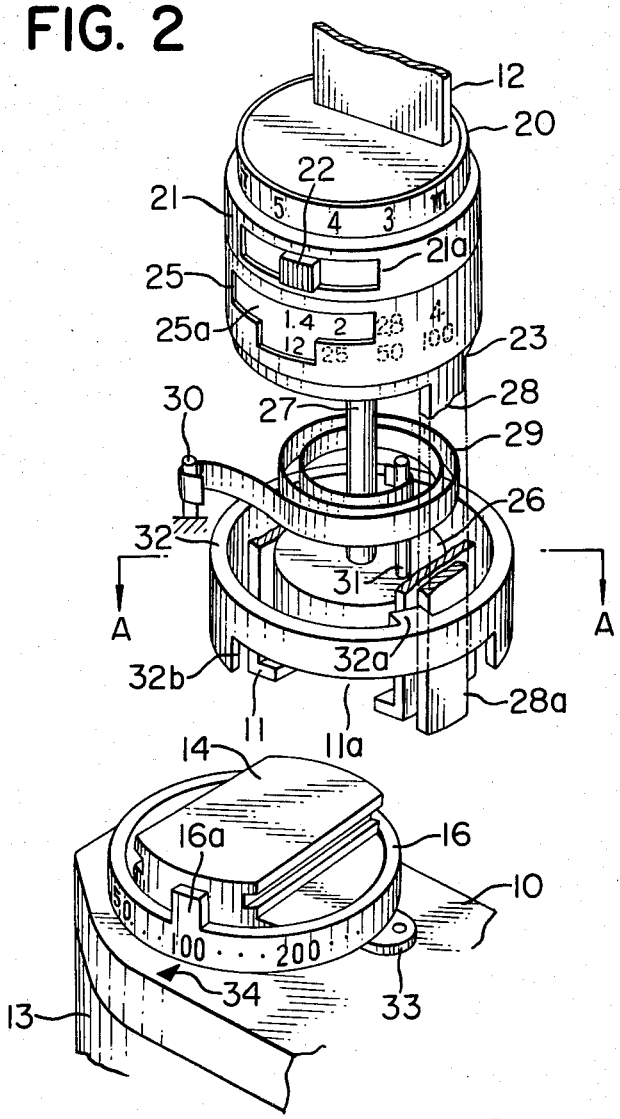
FIG. 2 is an exploded perspective view of the calculating device according to a second embodiment of the present invention, with a camera shown fragmentarily.

In the following, a second embodiment of the calculating device according to the present invention will be described in reference to FIG. 2, wherein the same consitituent members and parts as those in FIG. 1 are designated by the same reference numerals.

The film sensitivity graduation cylinder 23 has a shaft 27 which is rotatably mounted relative to the fixed supporting column 12 and which has a disc 26 at its tip end. Further, the cylinder is provided with an interlocking member 28. These members 23, 26, 27 and 28 are integrally formed. The tip end 28a of the interlocking member 28 is engageable with a signal projection 16a of the film sensitivity setting dial 16 provided around the accessory shoe 14 of the camera body 10. A spiral spring 29 is hooked between a pin 30 studded to the fixed part of the speed-light and a pin 31 fixedly provided on the disc 26 to energize the circular disc 26 in a clockwise direction (as viewed from above) over the entire range of its rotation. (It should be noted that, for the sake of convenience in illustration, the pin 30 is not shown directly studded to the fixed part). A cylindrical shoe cover 32 encloses the circular disc 26 and is rotatably supported on the fixed part. (The holding state of this shoe cover is not illustrated in the drawing). On one part of the inner periphery of the shoe cover 32, there is provided an engaging projection 32a which is engaged with the interlocking member 28 by the clockwise energizing force of the spiral spring 29. The height of shoe cover 32 is so determined as to cover the mounting member 11. A notch 32b consititues a guide path for mounting the mounting member 11 on the accessory shoe 14.

The film sensitivity setting dial 16 locked by a locking member 33 in a semi-fixed manner varies the resistance value of the variable resistor for introducing the film sensitivity into a light metering circuit (not shown) by its rotation, as is well known. The locking member 33 is to inhibit rotation of the dial 16, which prevents the dial 16 from unexpected rotation. When the locking member 33 is released from its locking mode, the dial 16 becomes rotatable. A signal projection 16a provided at a predetermined position of the dial 16 is positioned within the rotational path of the tip end 28a of the interlocking member 28, when the mounting member 11 is mounted onto the accessory shoe 14, and does not interfere with the shoe cover 32. Even after the mounting member 11 is mounted on the accessory shoe 14, and the shoe cover 32 is rotated, as will be described later, to prevent mounting member 11 from slipping out of the shoe 14, the signal protection 16a and the tip end 28a remain engagable with each other.

As will be seen hereinafter, the projecting position of the signal projection 16a is so determined that a graduation with a numerical value equal to the film sensitivity as set by the film sensitivity setting dial 16 appears in the indicating window 25a.

In the following, the operation of the calculating device as constructed in the above-described manner will be explained in reference to FIGS. 3A and 3B.

First, the film sensitivity setting dial 16 is rotated to cause a graduation corresponding to sensitivity of the film loaded in the camera to meet with an indication mark 34. Next, the shoe cover 32 is rotated counterclockwise to bring it to a setting position, thereby causing a notch (or fitting portion) 11a of the mounting member 11 to confront the notch 32b. At this time, the disc 26 and the graduation cylinder 23 are rotated counter-clockwise by the engagement between the engagement projection 32a and the interlocking member 28, whereby the spiral spring 29 is wound. Also, the graduations of the aperture value and the film sensitivity in window 25a are at their predetermined starting conditions, as shown in FIG. 2.

Figures 3A, 3B:
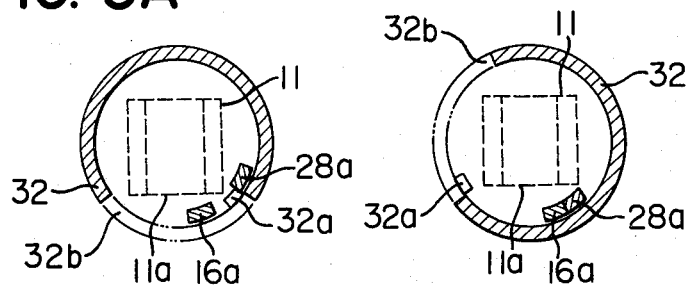
FIGS. 3A and 3B are cross-sectional views taken along line A-A' in FIG. 2 and illustrating the relationship of certain parts at different times.

In the above-described state, when the mounting member 11 is fitted onto the accessory shoe 14, the tip end 28a of the interlocking member 28, the shoe cover 32, and the projection 16a are in their mutual positional relationship as shown in FIG. 3A. At the shown position of the shoe cover 32, the engagement projection 32a is so positioned that the tip end 28a of the interlocking member 28 may be away counterclockwise from the position of the signal projection 16a when the film sensitivity setting dial 16 is set at the lowest film sensitivity (e.g., ASA 12). This is for securing the required association between the tip end 28a of the interlocking member 28 and the signal projection 16a at the time of setting the lowest film sensitivity.

After this, the shoe cover 32 is rotated in the clockwise direction, whereby the disc 26, the interlocking member 28, and the graduation cylinder 23, which are energized in the clockwise direction by the spiral spring 29, follow the rotation of the engagement projection 32a to thereby rotate clockwise. When the tip end 28a of the interlocking member 28 is engaged with the signal projection 16a, the interlocking member 28 stops its rotation at this engagement point, since the dial 16 is locked by the locking member 33. As a result, the disc 26 and the graduation cylinder 23 also stop their rotation, and the film sensitivity as set by the dial 16 appears in the indication window 25*a*. Thereafter, this state remains unchanged, even when the shoe cover 32 is rotated to a predetermined final position. As a result, combination of the aperture value and the object distance in this state constitute an appropriate combination for the film sensitivity. The positional relationship of the tip end 28*a* of the interlocking member, the shoe cover 32 and the signal projection 16*a* is shown in FIG. 3B. In this state, sinc the notch 32*b* of the shoe cover 32 closes the notch 11*a* of the mounting member 11, the mounting member 11 cannot slip out of the accessory shoe 14. At the final position of the shoe cover 32, the engagement projection 32*a* is positioned somewhat away in the clockwise direction from the signal projection 16*a*, in order that the tip end 28*a* of the interlocking member 28 may be properly engaged with the signal projection 16*a* when the film sensitivity setting dial 16 is set at the highest film sensitivity (e.g., ASA 3200). Thus, the calculator automatically operates in accordance with an arbitrary film sensitivity.

According to the second embodiment of the present invention as described in the foregoing, which the calculating device which operates in association with mounting of the speed-light onto the camera body; hence there is no necessity for conducting separate setting of the film sensitivity on the calculating device. This makes it possible to dispense with the trouble of separately operating the calculating device, so that the camera operation becomes simple and easy.

We claim:

1. In a camera system having a camera body including a mounting section and an operating dial which can be rotated to a predtermined position corresponding to the sensitivity of film to be loaded in the camera body and fixed at the predetermined position; and an electronic flash device including a housing and a support member with a mounting section capable of being engaged with the mounting section of the camera body and a calculating for calculating a flash photography value dependent upon the film sensitivity; the improvement which comprises means dependent upon the engagement of said mounting sections for transferring to said calculator a film sensitivity signal from said camera body determined by said predetermined position of said operating dial.

2. The improvement of claim 1, wherein said signal transferring means comprises a rotatable member on said support member and a signal member on said dial for setting the rotational position of said rotatable member.

3. The improvement of claim 2, wherein said rotatable member has means for displaying film sensitivity values.

4. The improvement of claim 2, wherein said dial is an annulus surrounding said mounting section on said camera body, and said rotatable member is an annulus surrounding said support member and coaxial with said dial when said mounting section are engaged.

5. The improvement of claim 4, wherein said rotatable member has an interlocking member engageable with said signal member of said dial to set the position of said rotatable member.

6. The improvement of claim 5, wherein said calculator has means for holding said interlocking member away from said signal member until said mounting sections are engaged and means for thereafter moving said interlocking member into engagement with said signal member.

7. The improvement of claim 6, wherein said moving means comprises a spring and said holding means comprises a part rotatable about said support member and having an element against which said interlocking member is biased by said spring.

8. The improvement of claim 7, wherein said rotatable part comprises a cylinder cover for said mounting sections having means for permitting said mountng sections to be engaged and for thereafter holding said mounting sections engaged upon rotation of said cover, to rotation of said cover permitting said interlocking member to engage said signal member.

* * * * *